United States Patent
Ishikawa et al.

(10) Patent No.: US 8,203,245 B2
(45) Date of Patent: Jun. 19, 2012

(54) MOTOR ROTOR, HAVING MAGNET HOLDING PROJECTIONS

(75) Inventors: Ryuji Ishikawa, Hazu-gun (JP); Jiro Nakano, Nagoya (JP)

(73) Assignee: JTEKT Corporation, Osaka-shi (JP)

( * ) Notice: Subject to any disclaimer, the term of this patent is extended or adjusted under 35 U.S.C. 154(b) by 239 days.

(21) Appl. No.: 12/426,617

(22) Filed: Apr. 20, 2009

(65) Prior Publication Data

US 2009/0261677 A1  Oct. 22, 2009

(30) Foreign Application Priority Data

Apr. 21, 2008 (JP) .................... 2008-109828

(51) Int. Cl.
*H02K 21/12* (2006.01)

(52) U.S. Cl. ......... 310/156.12; 310/156.08; 310/156.19; 310/156.21

(58) Field of Classification Search ............... 310/61–62, 310/156.12, 156.19, 156.21, 156.45, 156.55, 310/156.08
See application file for complete search history.

(56) References Cited

U.S. PATENT DOCUMENTS

| | | | |
|---|---|---|---|
| 6,940,199 B2 * | 9/2005 | Imamura et al. | 310/156.48 |
| 2006/0017342 A1 * | 1/2006 | Park | 310/156.19 |
| 2008/0048517 A1 * | 2/2008 | Ochiai et al. | 310/218 |

FOREIGN PATENT DOCUMENTS

| | | | |
|---|---|---|---|
| JP | 02119544 A * | 5/1990 | |
| JP | 2003-230239 | 8/2003 | |
| JP | 2003264948 A * | 9/2003 | |
| JP | 2004023944 A * | 1/2004 | |

OTHER PUBLICATIONS

Machine Translation JP2003264948 (2003) and JP2004023944 (2004).*

* cited by examiner

*Primary Examiner* — Quyen Leung
*Assistant Examiner* — Jose Gonzalez Quinones
(74) *Attorney, Agent, or Firm* — Oblon, Spivak, McClelland, Maier & Neustadt, L.L.P.

(57) ABSTRACT

A motor rotor has: a rotor yoke; a plurality of magnet fixing sections formed on the lateral surface of the rotor yoke; segment magnets respectively fixed to the magnet fixing sections and extending in the axial direction of the rotor yoke; and a plurality of projections which are provided, on the rotor yoke, at each boundary section located between each of the adjacent magnet mounting sections, and which protrude outward from the rotor yoke; and a pair of end claws are formed by bifurcating the end of each projection into two prongs, and each of the end claws is locked to the outer surface of each of the segment magnets.

10 Claims, 4 Drawing Sheets

MOTOR ROTOR, HAVING MAGNET HOLDING PROJECTIONS

INCORPORATION BY REFERENCE

The disclosure of Japanese Patent Application No. 2008-109828 filed on Apr. 21, 2008 including the specification, drawings and abstract is incorporated herein by reference in its entirety.

BACKGROUND OF THE INVENTION

1. Field of the Invention

The invention relates to a motor rotor provided with a plurality of segment magnets fixed on the lateral surface of a rotor yoke, an electric power steering apparatus using the motor as a drive source thereof, and a method for producing the motor rotor.

2. Description of the Related Art

An example of this type of motor rotor is available in which a plurality of segment magnets are fixed with an adhesive to the outer peripheral surface of a rotor yoke having a cylindrical shape (see, for example, Japanese Patent Application Publication No. 2003-230239 (JP-A-2003-230239)).

However, since the coefficients of thermal expansion differ between the rotor yoke and the segment magnets, the adhesive is subjected to stress when the motor generates heat. When there are frequent opportunities for the motor being used at a high load and reaching a high temperature, the adhesive undergoes thermal deterioration resulting in a decrease in adhesive strength thereof. In addition, the adhesive strength of the adhesive similarly decreases in cases of being exposed to high temperatures and high-temperature environments for prolonged periods of time. Consequently, in the case segment magnets are fixed to a rotor yoke with an adhesive alone as in the structure of the related art, there is the possibility of the segment magnets separating from the rotor yoke and the output torque of the motor becoming unstable. When this type of motor is used in an electric power steering apparatus, the situation can occur in which steering feel decreases together with the decrease in output torque of the motor.

SUMMARY OF THE INVENTION

With the foregoing in view, an object of the invention is to provide a motor rotor capable of enhancing reliability of fixing of segment magnets to a rotor yoke, an electric power steering apparatus and a production process of the motor rotor.

The motor rotor as claimed in the invention has: a rotor yoke; a plurality of magnet fixing sections formed on the lateral surface of the rotor yoke; segment magnets respectively fixed to the magnet fixing sections and extending in the axial direction of the rotor yoke; and a plurality of projections which are provided, on the rotor yoke, at each boundary section located between each of the adjacent magnet mounting sections, and which protrude outward from the rotor yoke, wherein a pair of end claws are formed by bifurcating the end of each projection into two prongs, and each of the end claws is locked to the outer surface of each of the segment magnets.

According to this embodiment, each segment magnet is sandwiched in the width direction by the plurality of projections provided on the rotor yoke, thereby restricting each segment magnet from shifting in the width direction. In addition, the pair of end claws obtained by bifurcating the end of each projection into two prongs locks to the curved surface of the segment magnets, thereby preventing detachment of the segment magnets toward the outward direction of the rotor. As a result thereof, the reliability of fixing the segment magnets to the rotor yoke is enhanced, and the output torque of the motor is stabilized.

In addition, the rotor yoke of the motor rotor as claimed in this embodiment may be formed by laminating a plurality of steel sheets in the axial direction thereof. In addition, in a state in which the plurality of steel sheets are laminated, a group of steel sheets at a prescribed location in the axial direction among the plurality of steel sheets may each have a Y-shaped protruding piece formed thereon, and the Y-shaped protruding pieces may be layered to form the projections.

According to this embodiment, a conventional rotor can be changed to a rotor as claimed in an embodiment of the invention by replacing a portion of the steel sheets among the plurality of steel sheets that compose the conventional rotor with steel sheets as claimed in an embodiment of the invention having Y-shaped protruding pieces. As a result, costs required for changing equipment in order to change from a conventional rotor to a rotor as claimed in an embodiment of the invention are held to a low level. In addition, if projections as in this configuration are only provided at two locations in the axial direction of the rotor yoke, magnetic leakage from the segment magnets to the projections can be inhibited in comparison with the case of providing projections over the entire axial direction of the rotor yoke.

In addition, the motor rotor as claimed in this embodiment may have a cylindrical cover that engages with the outside of the rotor yoke and covers the plurality of segment magnets.

According to this embodiment, pieces of the segment magnets are prevented from flying off by the cylindrical cover even if a portion of the segment magnets are chipped.

In addition, a motor containing the motor rotor as claimed in this embodiment may be applied to an electric power steering apparatus.

Since the electric power steering apparatus as claimed in this embodiment is provided with a drive source in the form of a motor having a high degree of reliability of fixing of the segment magnets to the rotor yoke, both the output torque of the motor and steering feel are stable.

In addition, as a method for producing the motor rotor as claimed in this embodiment, the segment magnets may be arranged on the magnet fixing sections located between the projections provided on the rotor yoke, and the segment magnets may be fixed to the rotor yoke by caulking end claws bifurcated into two prongs provided on the ends of the projections.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
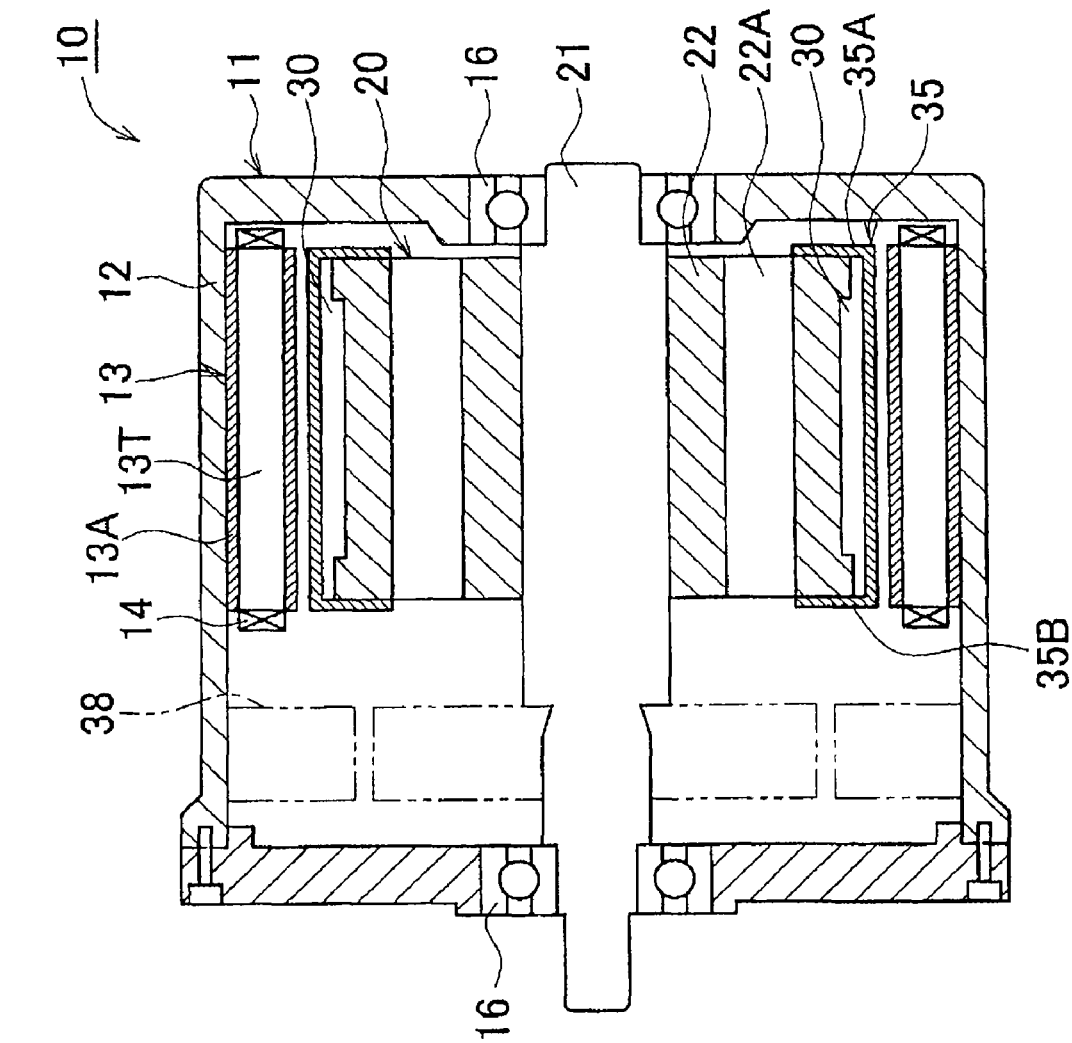
FIG. 1 is a lateral sectional view of a motor as claimed in a first embodiment of the invention.
Figure 2:
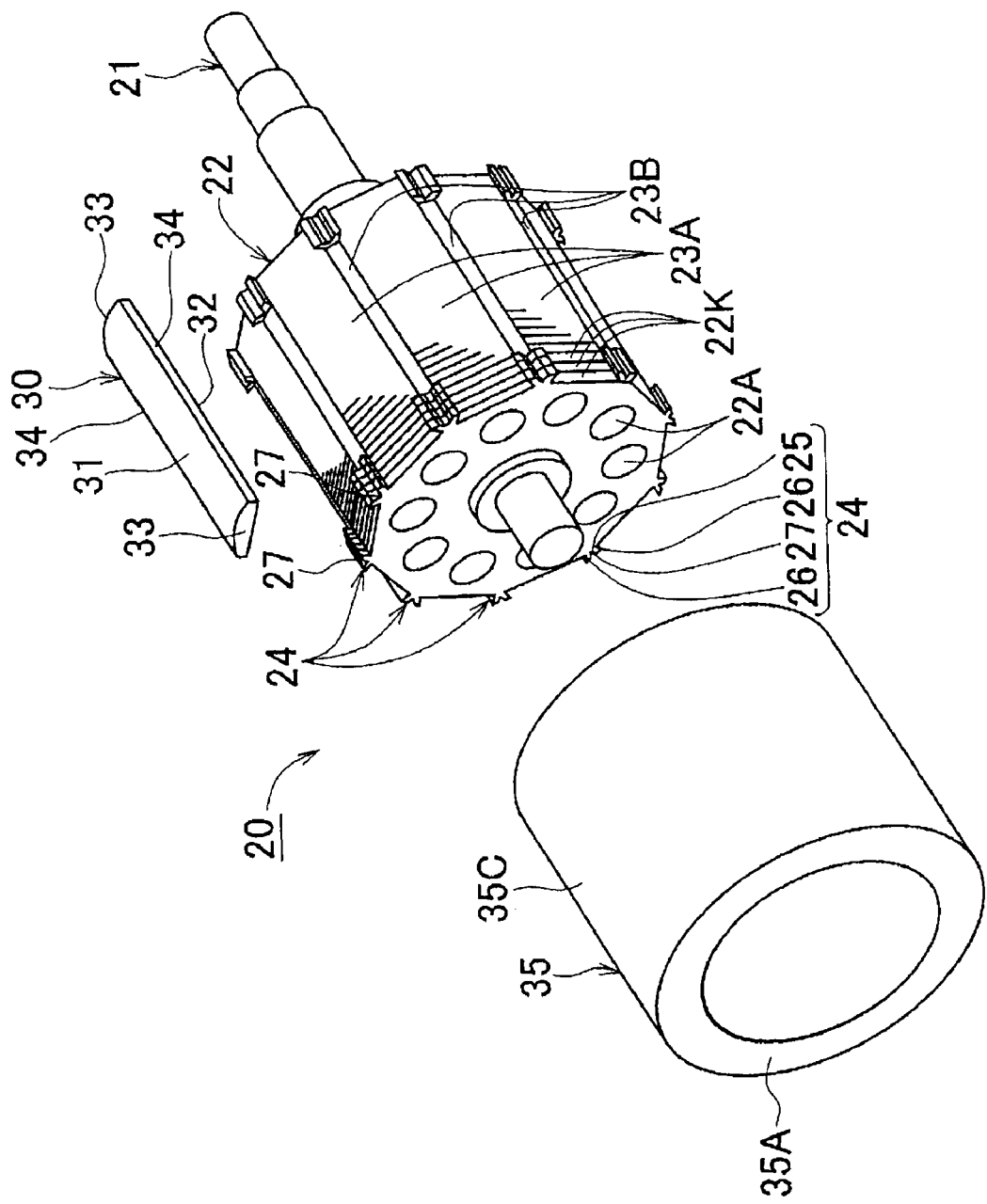
FIG. 2 is an exploded perspective view of a rotor.

[First Embodiment] The following provides an explanation of a first embodiment of the invention based on FIGS. 1 to 3. A motor 10 shown in FIG. 1 is a brushless, three-phase alternating current motor, and a stator 11 of this motor 10 employs a structure in which a stator core 13 is fixed to the inside of a motor housing 12 by engaging therewith. The motor housing 12 has the form of, for example, a cylinder that is closed on both ends. In addition, the stator core 13 has a structure in which a plurality of teeth 13T are protruding to the inside from the inner peripheral surface of a cylindrical body 13A, and electromagnetic coils 14 are respectively wound around each of these teeth 13T.

A rotor 20 of this motor 10 has a structure in which a rotor shaft 21 passes through the center of a rotor yoke 22, and a plurality of segment magnets 30 are fixed to the lateral surface of the rotor yoke 22. As shown in FIG. 2, the segment magnets 30 are roughly in the form of long plates extending in the axial direction of the rotor yoke 22, and are provided with a fixing flat surface 32 on the lateral surface on the side of the rotor yoke 22, and a curved surface 31 on the side at the rear of the fixing flat surface 32. The curved surface 31 has the form of a circular arc that gradually protrudes from both side surfaces 34, 34 in the width direction of the segment magnet 30 towards the center position in the width direction. In addition, both side surfaces 34, 34 and both ends 33, 33 of the segment magnets 30 are at right angles to the fixing flat surface 32.

The rotor yoke 22 is composed by laminating a plurality of steel sheets 22K (and more specifically, silicon steel sheets), and is in the shape of a polygonal column having an overall shape of a regular polygon (such as a regular decagon). The flat surface of each side of the regular polygon is the magnet fixing section 23A, and as shown in FIG. 3B, a fixing flat surface 32 of the segment magnet 30 is fixed to each magnet fixing section 23A.

Furthermore, in this embodiment, the fixing flat surfaces 32 of the segment magnets 30 are fixed to the magnet fixing sections 23A by an adhesive. In addition, as shown in FIG. 2, a plurality of holes 22A for reducing weight are formed through the rotor yoke 22 around the penetrating portion of the rotor shaft 21.

A flat surface 23B is formed at each corner of the polygon in the rotor yoke 22. These flat surfaces 23B extend over the entire rotor yoke 22 with the exception of both ends in the axial direction thereof. Projections 24, 24 are formed protruding from both ends in the axial direction of each corner of the polygon in the rotor yoke 22. Each projection 24 is composed by laminating Y-shaped protruding pieces 24Y roughly in the shape of the letter Y as viewed from the axial direction of the rotor shaft 21 protruding from a portion of the group of steel sheets 22K laminated on both ends of the rotor yoke 22 among the plurality of steel sheets 22K composing the rotor yoke 22.

Figure 3A:
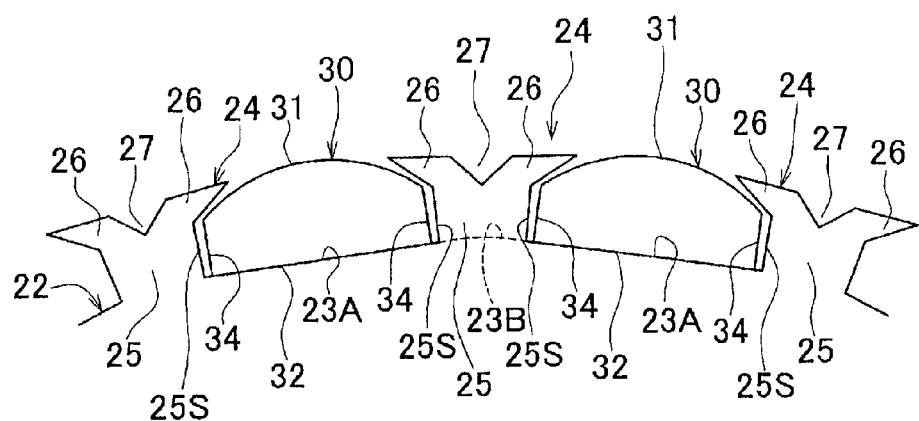
FIG. 3 is a front view of projections.
Figure 3B:
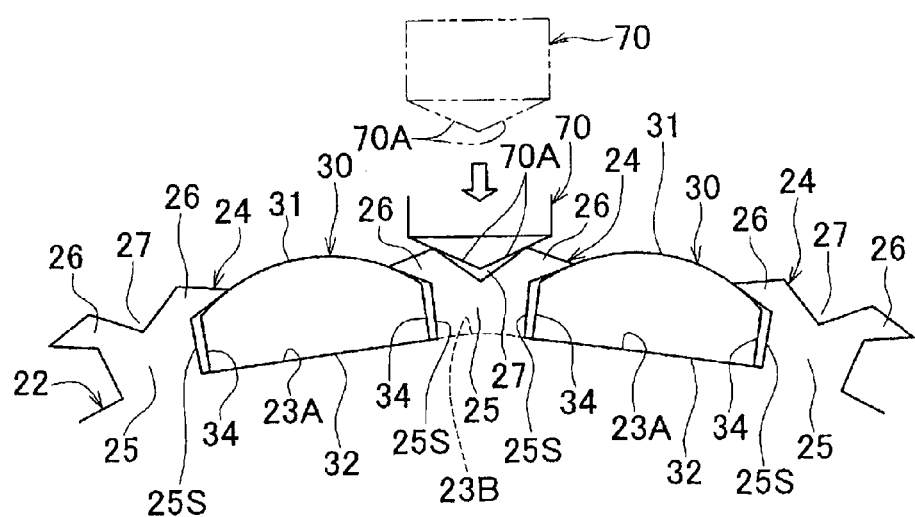

FIG. 3B shows an enlarged view of a projection 24. Furthermore, FIG. 3A shows an enlarged view of a projection 24 at an intermediate stage of the production process of the rotor 20. As shown in FIG. 3B, each projection 24 has a trunk 25 standing upright from the flat surface 23B. Both side surfaces 25S, 25S of the trunk 25 are rising at roughly a right angle from the magnet fixing sections 23A, 23A adjacent to the flat surface 23B on both sides. As a result, together with the side surfaces 34, 34 of the segment magnets 30 being in parallel with side surfaces 25S, 25S of the trunk 25, the projections 24 have a structure in which the width of the trunk 25 gradually widens the farther away from the flat surface 23B in the radial direction. In addition, a clearance is provided between the side surfaces 34 of the segment magnets 30 and the side surfaces 25S of the trunk 25, and a cushioning member in the form of an adhesive (not shown), for example, is coated herein.

The ends of the projections 24 (namely, the ends of the trunks 25) are in the form of a pair of end claws 26, 26 bifurcated into two prongs, and these end claws 26, 26 are protruding from both side surfaces 25S, 25S of the trunk 25 towards the magnet fixing sections 23A, 23A. In addition, the surfaces of the end claws 26 facing the magnet fixing sections 23A are inclined to as to move away from the magnet fixing sections 23A the farther away from both side surfaces 25S of the trunk 25. Each end claw 26 locks to a lateral edge of the curved surface 31 of the segment magnets 30.

A triangular groove 27 is formed between both end claws 26, 26 of the projections 24. The corners where the inner surfaces of the triangular groove 27 intersect the end surfaces of the end claws 26 is the farthest portion of the projections 24 from the center of the rotor 20, and that distance is slightly less than the distance from the farthest portion (the center of the curved surface 31 in the with direction) of the segment magnets 30 from the center of the rotor 20.

A cylindrical cover 35 is engaged with the outside of the rotor yoke 22 and covers the segment magnets 30. As shown in FIG. 1, the cylindrical cover 35 has a structure in which thin-walled cylindrical section 35C makes inside contact with the segment magnets 30, and flanges 35A, 35B protrude from both ends of the cylindrical section 35C towards the inside in the radial direction of the cylindrical section 35C. The flanges 35A, 35B are locked to both ends of the rotor yoke 22.

As shown in FIG. 1, the rotor 20 is arranged so that the entirety of each segment magnet 30 in the lengthwise direction faces the inside of the stator core 13. Both ends of the rotor shaft 21 are rotatably pivotally supported by bearings 16, 16 incorporated in both end walls of the motor housing 12.

Furthermore, a rotational position sensor 38 for detecting a rotational position of the rotor 20 is incorporated within the motor 10 of this embodiment.

The configuration of the motor 10 of this embodiment is as described above. Next, an explanation is provided of a method for producing the above-mentioned rotor 20. In producing the rotor 20, after laminating a plurality of steel sheets 22K not having the Y-shaped protruding pieces 24Y, a plurality of steel sheets 22K having the Y-shaped protruding pieces 24Y on both ends thereof are laminated to produce the rotor yoke 22, and the rotor shaft 21 is then passed through the rotor yoke 22.

Next, an adhesive is applied to the entire fixing flat surface 32 of the segment magnets 30 together with applying an adhesive to the side 34 on both ends of the segment magnets 30. The fixing flat surface 32 of each segment magnet 30 is then adhered to each magnet fixing section 23A of the rotor yoke 22. At this time, since the segment magnet 30 interferes with the end claws 26, 26 when it approaches the magnet fixing section 23A by moving in a direction perpendicular to the axial direction of the rotor yoke 22, the segment magnet 30 moves in the axial direction of the rotor yoke 22 and enters between the magnet fixing section 23A and the end claw 26, and the fixing flat surface 32 of the segment magnet 30 is adhered by being pressed against the magnet fixing section 23A as shown in FIG. 3A at the location where both ends 33, 33 of the segment magnet 30 align with both ends of the rotor yoke 22 as shown in FIG. 2. At this time, the space between the side surfaces 34 of the segment magnets 30 and the projections 24 are adhered with adhesive at both ends of the segment magnets 30.

Next, as shown in FIG. 3B, a caulking tool 70 is pressed against the triangular groove 27 of the projection 24 from the side of the rotor yoke 22. The tip of the caulking tool 70 has a tapered shape, and the caulking tool 70 is provided with pressing surfaces 70A, 70A that become closer as they move towards the tip. In addition, the angle formed between these pressing surfaces 70A, 70A is wider than the angle formed by the inner surfaces of the triangular groove 27 in the projection 24. As shown in FIG. 3B, both pressing surfaces 70A, 70A are pressed against the both open edges of the triangular groove 27, the space between the end claws 26, 26 in the projection 24 is increased by spreading the end claws 26, 26 apart, and each end claw 26 is locked to a curved surface 31 of the segment magnets 30.

Next, the cylindrical cover 35 shown in FIG. 2 is engaged with the rotor yoke 22. Here, the cylindrical cover 35 has one of the flanges 35B, for example, of the pair of flanges 35A, 35B formed separately from the cylindrical section 35C, and the flange 35B is welded or brazed, for example, to the cylindrical section 35C after having engaged the cylindrical section 35C with the outside of the rotor yoke 22, thereby completing the rotor 20.

Next, an explanation is provided of the interaction and effects of the rotor 20 and the motor 10 of this embodiment. When a motor drive current in the form of a three-phase alternating current is applied to the motor 10, the intensity and direction of the magnetic flux of the plurality of electromagnetic coils 14 provided in the stator 11 change, and the rotor 20 rotates relative to the stator 11 due to magnetic force between each of the electromagnetic coils 14 and the segment magnets 30. Here, in the rotor 20 of this embodiment since the projections 24 are provided at only two locations in the axial direction of the rotor yoke 22 of this embodiment, leakage of magnetism from the segment magnets 30 to the projections 24 is inhibited as compared with the case of providing the projections 24 over the entire axial direction, thereby minimizing reductions in output torque of the motor 10 caused by magnetic leakage.

The electromagnetic coils 14 generate heat as a result of the application of current. The temperature of the rotor 20 rises due to this heat. Whereupon, due to a difference in the coefficients of thermal expansion between the rotor yoke 22 and the segment magnets 30, adhesive between the rotor yoke 22 and the segment magnets 30 is subjected to stress. If the motor 10 is frequently used at a high load and the number of opportunities for reaching a high temperature increases, the adhesive undergoes thermal deterioration resulting in a possible decrease in the adhesive strength thereof.

However, according to the configuration of the rotor 20 of this embodiment, as shown in FIG. 3B, each segment magnet 30 is sandwiched in the width direction by a plurality of the projections 24 provided on the rotor yoke 22, thereby restricting shifting in the width direction. In addition, since the pair of end claws 26, 26, formed by bifurcating the end of each of the projections 24 into two prongs, locks to the curved surfaces 31 of the segment magnets 30, the segment magnets 30 are prevented from detaching to the outside in the radial direction of the rotor 20. Moreover, movement of the segment magnets 30 in the axial direction of the rotor 20 is also restricted by the flanges 35A, 35B of the cylindrical cover 35.

As a result thereof, even if adhesive strength between the segment magnets 30 and the rotor yoke 22 decreases due to the adhesive, the situation in which a segment magnet 30 moves within the cylindrical cover 35 is avoided. Namely, according to the rotor 20 of this embodiment, the reliability of the fixing of the segment magnets 30 to the rotor yoke 22 is improved over that of the related art, and the output torque of the motor 10 provided with this rotor yoke 22 is stable. In addition, since the rotor 20 of this embodiment can be produced by replacing a portion of the steel sheets among the plurality of steel sheets that compose a conventional rotor with the steel sheets 22K in the form of having the Y-shaped protruding pieces 24Y (see FIG. 2), costs required for changing equipment in order to change from a conventional rotor to the rotor 20 of this embodiment are held to a low level.

Figure 4:
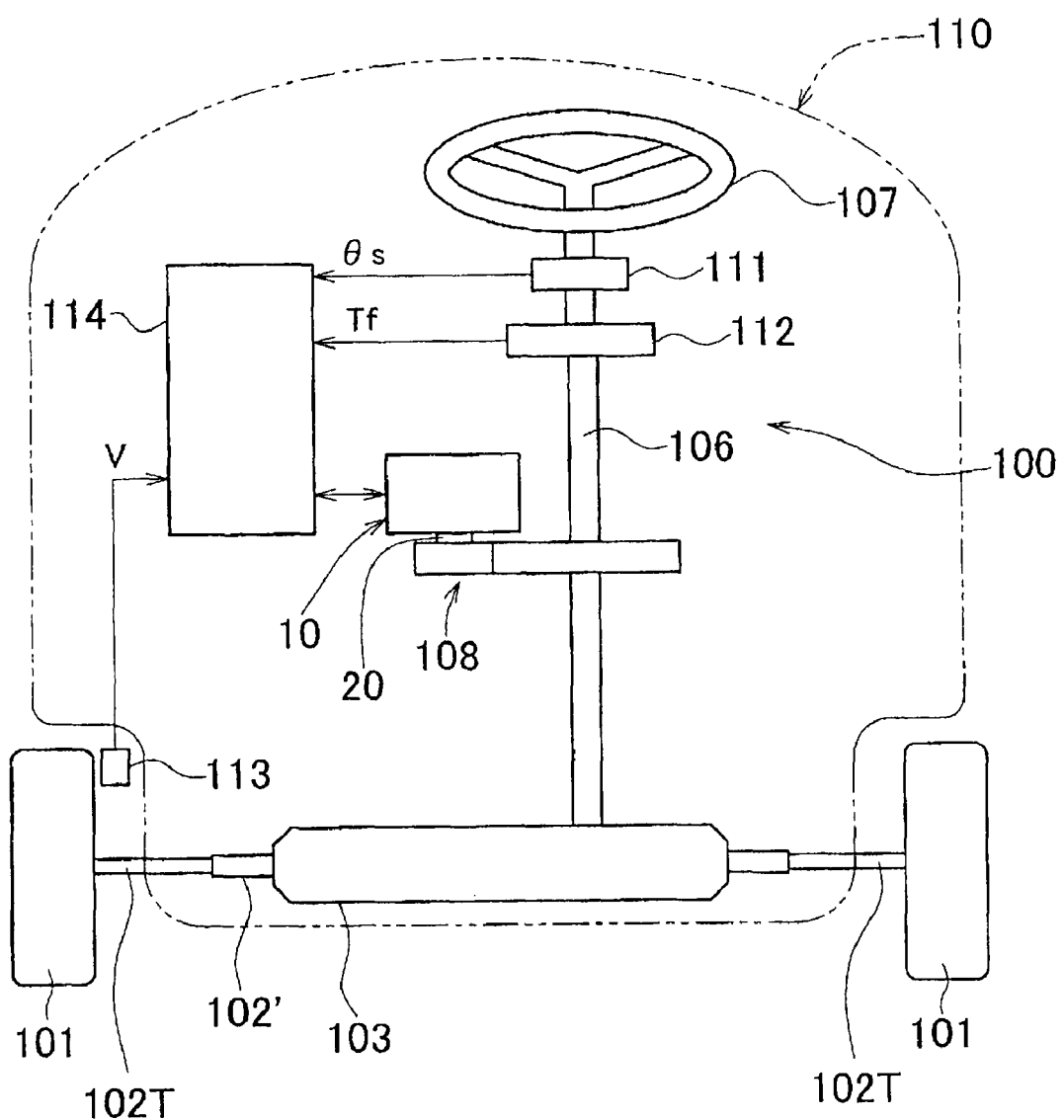
FIG. 4 is a conceptual drawing of an electric power steering apparatus.

[Second Embodiment] The following provides an explanation of an embodiment of an electric power steering apparatus as claimed in the invention. As shown in FIG. 4, an electric power steering apparatus 100 of this embodiment is provided with a turning wheel connecting shaft 102 extending between a pair of turning wheels 101, 101 provided on a vehicle 110, and a shaft case 103 covering the outside of the turning wheel connecting shaft 102. Both ends of the turning wheel connecting shaft 102 are connected to each turning wheel 101, 101 via tie rods 102T, 102T, and the shaft case 103 is fixed to the chassis of the vehicle 110. In addition, a rack (not shown) is formed at an intermediate portion of the turning wheel connecting shaft 102, and a pinion (not shown) passing through the intermediate portion of the shaft case 103 from the side meshes with this rack.

A steering shaft 106 is connected to the upper end of the pinion, and a steering wheel 107 is further connected to the upper end of the steering shaft 106. The rotor 20 of the motor 10 explained in the first embodiment is connected to an intermediate portion of the steering shaft 106 via a reduction gear groove 108. In addition, a steering angle sensor 111 and a torque sensor 112 are attached to the steering shaft 106, which together with detecting the steering angle θs of the steering wheel 107, detect the steering torque Tf applied to the steering shaft 106. Moreover, a velocity sensor 113 for detecting velocity V accompanying rotation of the turning wheels 101 is provided in the vicinity of the turning wheels 101. A steering control apparatus 114 drives the motor 10 corresponding to operating status based on the detection signals of the steering angle sensor 111, the torque sensor 112 and the velocity sensor 113, thereby enabling the turning wheels 101, 101 to be turned while the motor 10 assists operation of the steering wheel by a driver.

In this manner, the electric power steering apparatus 100 of this embodiment is provided with the motor 10 explained in the first embodiment as a drive source, and since the motor 10 has a high level of reliability of fixing of the segment magnets 30 as compared with the related art, both the output torque of the motor 10 and the steering feel of the electric power steering apparatus 100 are stable.

[Other Embodiments] The invention is not limited to the previously described embodiments, but rather embodiments in the manner of those explained to follow are also included within the scope of the invention. Moreover, in addition to the embodiments explained below, the invention can also be carried out by modifying in various ways within a range that does not deviate from the gist thereof.

(1) Although the segment magnets 30 are fixed to the rotor yoke 22 by an adhesive in the above-mentioned first embodiment, a structure may also be employed in which the segment magnets 30 are fixed to the rotor yoke 22 with the projections 24 and the cylindrical cover 35 only without using an adhesive.

(2) In addition, the segment magnets 30 may be fixed to the rotor yoke 22 with the projections 24 only without using an adhesive or the cylindrical cover 35. In this case, the segment magnets 30 are prevented from moving in the axial direction of the rotor 20 by frictionally locking the end claws 26 to the curved surface 31.

(3) In the first embodiment although the projections 24 are deformed by caulking by causing the caulking tool 70 to approach the projections 24 from the side of the rotor yoke 22, a plurality of triangular protruding ridges, for example, may be formed protruding corresponding to the projections 24 on the inner peripheral surface of a cylindrical body (not shown), and the space between the end claws 26, 26 may be pushed apart by the triangular protruding ridges while pushing the rotor yoke 22 into the cylindrical body.

(4) Although the invention is applied to a so-called column electric power steering apparatus, in which the motor 10 is coupled with a gear to an intermediate location of the steering shaft 106, in the above-mentioned embodiments, the invention may also be applied to a so-called rack electric power steering apparatus in which the entire motor has a hollow structure, a ball nut is fixed therein, and the ball nut meshes with ball threads formed at an intermediate portion of the turning wheel connecting shaft 102, or the invention may be applied to a pinion electric power steering apparatus, in which a motor is coupled to a turning wheel connecting shaft with a rack and pinion mechanism.

What is claimed is:

1. A motor rotor comprising:
a rotor yoke;
a plurality of magnet fixing sections formed on a peripheral surface of the rotor yoke;
a plurality of segment magnets respectively fixed to the magnet fixing sections and extending in an axial direction of the rotor yoke, wherein each of the segment magnets has a fixing flat surface to be fixed to the magnet fixing sections, an outer surface located and extending opposite the fixing flat surface, and side surfaces joining the fixing flat surface and the outer surface; and
a plurality of projections provided on the rotor yoke at each boundary section located between each of the adjacent magnet mounting sections and which protrude outward from the rotor yoke,
wherein the projections are provided at each axial end of the rotor yoke and are not provided between the axial ends of the rotor yoke, and
wherein a pair of end claws are formed by bifurcating the end of each projection into two prongs, and each of the end claws is locked to the outer surface of each of the segment magnets,
wherein each of theprojections is spaced from the side surfaces of the segment magnets to which the end claws thereof are locked and does not engage any part of the side surfaces of the segment magnets to which the end claws thereof are locked, whereby a clearance is formed between the respective projections and the entirety of the side surfaces of the segment magnets to which the end claws thereof are locked.

2. The motor rotor according to claim 1, wherein
the rotor yoke is formed by laminating a plurality of steel sheets in the axial direction, and a group of steel sheets at a prescribed location in the axial direction among the plurality of steel sheets each has a Y-shaped protruding piece in a state in which the plurality of steel sheets are laminated, and the Y-shaped protruding pieces are layered to form the projections.

3. The motor rotor according to claim 2, wherein
the Y-shaped protruding pieces are provided on a group of the steel sheets located at two locations in the axial direction of the rotor yoke in the state in which the plurality of steel sheets are laminated.

4. The motor rotor according to claim 1, further comprising:
a cylindrical cover that engages with the outside of the rotor yoke and covers the plurality of segment magnets.

5. The motor rotor according to claim 4, wherein
the cylindrical cover includes a cylindrical portion and flanges extending radially inward from both ends in the axial direction of the cylindrical portion.

6. The motor rotor according to claim 1, wherein:
the outer surface is curved and protrudes in a shape of a circular arc from both of the side surfaces in the width direction towards a center position of the segment magnets.

7. The motor rotor according to claim 1, wherein
the rotor yoke is in a shape of a polygonal column.

8. An electric power steering apparatus comprising:
a steering wheel; and
a motor for assisting steering effort from the steering wheel,
wherein the motor includes a stator and a rotor arranged to rotate on a rotation axis,
wherein the rotor has:
a rotor yoke comprising a laminate of sheets stacked in the axis direction of the rotor yoke;
a plurality of magnet fixing sections arranged circumferentially on a peripheral surface of the rotor yoke, the magnet fixing sections each being circumferentially separated by boundary sections;
a plurality of segment magnets respectively fixed to the magnet fixing sections and extending in the axis direction of the rotor yoke, wherein each of the segment magnets has a fixing flat surface to be fixed to the magnet fixing sections, an outer surface located and extending opposite the fixing flat surface, and side surfaces joining the fixing flat surface and the outer surface; and
a plurality of projections provided on at least one of said sheets of the rotor yoke at each of the boundary sections of the at least one of said sheets, and which protrude outward from the rotor yoke, wherein said projections are formed on the axially endmost sheet of said laminate at both axial ends of the rotor yoke, and wherein at least one sheet of said laminate between said axial ends of said rotor yoke does not have any of the projections,
wherein each of the plurality of projections comprises a pair of end claws formed by bifurcating the end of each projection into two prongs, and each of the end claws is locked to the outer surface of each of the segment magnets,
and wherein each of the projections is spaced from the side surfaces of the segment magnets to which the end claws thereof are locked and does not engage any part of the side surfaces of the segment magnets to which the end claws thereof are locked, whereby a clearance is formed between the respective projections and the entirety of the side surfaces of the segment magnets to which the end claws thereof are locked.

9. A motor rotor comprising:
a rotor yoke comprising a laminate of sheets;
plurality of magnet fixing sections arranged circumferentially on a peripheral surface of the rotor yoke, the magnet fixing sections each being circumferentially separated by boundary sections;
a plurality of segment magnets respectively fixed to the magnet fixing sections and extending in the direction of lamination the rotor yoke, wherein each of the segment magnets has an outer surface located and extending opposite the fixing flat surface;

a plurality of projections provided on at least one of said sheets of the rotor yoke at each of the boundary sections of the at least one of said sheets, and which protrude outward from the rotor yoke, wherein said projections are formed on the endmost sheet of said laminate at both ends of the rotor yoke, and wherein at least one sheet of said laminates between said ends of said rotor yoke does not have any of the projections; and a pair of end claws formed on each of said projections by bifurcating the end of each projection into two prongs, and each of the end claws is locked to the outer surface of each of the segment magnets, wherein each of the projections is spaced from side surfaces of the segment magnets to which the end claws thereof are locked and does not engage any part of the side surfaces of the segment magnets to which the end claws thereof are locked, whereby a clearance is formed between the respective projections and the entirety of the side surfaces of the segment magnets to which the end claws thereof are locked.

10. The motor rotor according to claim 9, wherein the rotor yoke is in a shape of a polygonal column, and the sheets are laminated in the direction of the axis of said column.

* * * * *